US010668432B2

(12) United States Patent
Oh et al.

(10) Patent No.: US 10,668,432 B2
(45) Date of Patent: Jun. 2, 2020

(54) HOLLOW FIBER MEMBRANE MODULE (71) Applicant: KOLON INDUSTRIES, INC., Gwacheon-si, Gyeonggi-do (KR)

(72) Inventors: Young Seok Oh, Yongin-si (KR); Kyoung Ju Kim, Yongin-si (KR); Jin Hyung Lee, Yongin-si (KR)

(73) Assignee: KOLON INDUSTRIES, INC., Seoul (KR)

( * ) Notice: Subject to any disclaimer, the term of this patent is extended or adjusted under 35 U.S.C. 154(b) by 192 days.

(21) Appl. No.: 15/737,456

(22) PCT Filed: May 17, 2016

(86) PCT No.: PCT/KR2016/005208
§ 371 (c)(1),
(2) Date: Dec. 18, 2017

(87) PCT Pub. No.: WO2016/208878
PCT Pub. Date: Dec. 29, 2016

(65) Prior Publication Data
US 2019/0015787 A1    Jan. 17, 2019

(30) Foreign Application Priority Data
Jun. 22, 2015  (KR) .......................... 10-2015-0088370

(51) Int. Cl.
*B01D 63/04*        (2006.01)
*H01M 8/04119*   (2016.01)
(Continued)

(52) U.S. Cl.
CPC ............. *B01D 63/04* (2013.01); *B01D 63/02* (2013.01); *H01M 8/04* (2013.01);
(Continued)

(58) Field of Classification Search
CPC .................................................. B01D 53/22; B01D 53/227; B01D 2053/224; B01D 63/02; B01D 63/04;
(Continued)

(56) References Cited

U.S. PATENT DOCUMENTS 4,239,729 A * 12/1980 Hasegawa .............. B01D 63/02
128/DIG. 3
5,002,590 A *  3/1991 Friesen .................. B01D 53/22
95/52
(Continued)

FOREIGN PATENT DOCUMENTS

CN    101959582 A    1/2011
CN    104620431 A    5/2015
(Continued)

OTHER PUBLICATIONS

English language machine translation for JP 2007-323982. Retrieved from http://translationportal.epo.org on Sep. 9, 2019. (Year: 2019).*
(Continued)

*Primary Examiner* — Jason M Greene
(74) *Attorney, Agent, or Firm* — Sughrue Mion, PLLC (57) ABSTRACT A hollow fiber membrane module includes a housing having an inlet formed one end thereof and an outlet formed on the other end thereof, in which hot and humid humidifying fluid flows in through the inlet and the humidifying fluid after humidifying a cool and dry fluid flowing out of the housing through the outlet; at least one hollow fiber membrane bundle which is inserted into the housing in the longitudinal direction; a partitioning part for supporting the hollow fiber membrane bundle and partitioning an inflow space, in which the humidifying fluid flowing into the housing momentarily remains, and an outflow space, in which the humidifying fluid momentarily remains before being discharged through
(Continued)

the outlet; and a potting part for potting both ends of the hollow fiber membrane bundle to the housing.

10 Claims, 8 Drawing Sheets

(51) Int. Cl.
*H01M 8/04* (2016.01)
*B01D 63/02* (2006.01)
*H01M 8/1018* (2016.01)

(52) U.S. Cl.
CPC ... *H01M 8/04141* (2013.01); *H01M 8/04149* (2013.01); *B01D 2313/08* (2013.01); *B01D 2313/19* (2013.01); *B01D 2313/20* (2013.01); *B01D 2313/23* (2013.01); *B01D 2313/32* (2013.01); *B01D 2313/44* (2013.01); *B01D 2319/04* (2013.01); *H01M 2008/1095* (2013.01); *Y02P 70/56* (2015.11)

(58) Field of Classification Search
CPC .......... B01D 2313/08; B01D 2319/04; H01M 8/04141; H01M 8/04149
See application file for complete search history.

(56) References Cited

U.S. PATENT DOCUMENTS

| | | | | |
|---|---|---|---|---|
| 5,264,171 A * | 11/1993 | Prasad | ............... | B01D 53/22 264/103 |
| 5,938,922 A * | 8/1999 | Fulk, Jr. | ............... | B01D 63/02 210/321.81 |
| 2006/0278359 A1* | 12/2006 | Wheaton | ............... | B01D 53/227 162/256 |
| 2011/0000842 A1 | 1/2011 | Takagi | | |
| 2015/0053083 A1* | 2/2015 | Taylor | ............... | B01D 63/04 96/6 |
| 2015/0188162 A1 | 7/2015 | Lee et al. | | |
| 2015/0364779 A1* | 12/2015 | Noh | ............... | H01M 8/04149 429/413 |
| 2017/0358808 A1* | 12/2017 | Kim | ............... | H01M 8/04149 |

FOREIGN PATENT DOCUMENTS

| | | | | | |
|---|---|---|---|---|---|
| JP | 2002-298895 | A | | 10/2002 | |
| JP | 2003-65566 | | * | 3/2003 | ............ B01D 63/02 |
| JP | 2003-65566 | A | | 3/2003 | |
| JP | 2004093072 | A | | 3/2004 | |
| JP | 2007-46801 | A | | 2/2007 | |
| JP | 2007-294347 | A | | 11/2007 | |
| JP | 2007-323982 | A | | 12/2007 | |
| JP | 4027756 | B2 | | 12/2007 | |
| JP | 2007323982 | | * | 12/2007 | ............ H01M 8/04 |
| JP | 2008-10306 | A | | 1/2008 | |
| JP | 4111086 | | | 7/2008 | |
| JP | 2010-107069 | A | | 5/2010 | |
| JP | 2010-117094 | A | | 5/2010 | |
| KR | 10-2008-0029285 | A | | 4/2008 | |
| KR | 10-2012-0102988 | A | | 9/2012 | |
| KR | 10-1185326 | B1 | | 9/2012 | |
| KR | 10-2013-0029306 | A | | 3/2013 | |
| KR | 10-2013-0034404 | A | | 4/2013 | |
| KR | 10-1337904 | B1 | | 12/2013 | |
| KR | 10-2014-0125101 | A | | 10/2014 | |
| KR | 10-1459907 | B1 | | 11/2014 | |
| KR | 101459907 | | * | 11/2014 | ........ H01M 8/04149 |

OTHER PUBLICATIONS

English language machine translation for JP 2003-65566. Retrieved from http://translationportal.epo.org on Sep. 9, 2019. (Year: 2019).*
English language machine translation for KR 101459907. Retrieved from http://translationportal.epo.org on Sep. 9, 2019. (Year: 2019).*
International Search Report for PCT/KR2016/005208, dated Aug. 2, 2016 (PCT/ISA/210).
European Patent Office Communication dated Jan. 18, 2019 in Application No. 16814591.0.

* cited by examiner

HOLLOW FIBER MEMBRANE MODULE

CROSS REFERENCE TO RELATED APPLICATIONS

This application is a National Stage of International Application No. PCT/KR2016/005208 filed May 17, 2016, claiming priority based on Korean Patent Application No. 10-2015-0088370, filed Jun. 22, 2015, the contents of all of which are incorporated herein by reference in their entirety.

TECHNICAL FIELD

The present invention relates to a hollow fiber membrane module, and more particularly, to a hollow fiber membrane module in which a retention time of a hot and humid humidifying fluid is increased and thus heat or material transfer efficiency may be increased to maximize humidifying efficiency of a product.

BACKGROUND ART

In general, a fuel cell refers to a power generation-type cell which produces electricity by bonding hydrogen and oxygen. The fuel cell may continuously produce electricity as long as hydrogen and oxygen are supplied, differently from general chemical cells, such as batteries or storage batteries, and have no heat loss, thus having efficiency twice that of an internal combustion engine. Further, the fuel cell converts chemical energy, generated by bonding hydrogen and oxygen, directly into electrical energy and thus discharges few pollutants. Therefore, the fuel cell is advantageous in that it is eco-friendly and reduces worries about resource depletion owing to increase in energy consumption. Fuel cells may be generally classified into a polymer electrolyte membrane fuel cell (PEMFC), a phosphoric acid fuel cell (PAFC), a molten carbonate fuel cell (MCFC), a solid oxide fuel cell (SOFC), an alkaline fuel cell (AFC), etc. according to kinds of electrolytes used. The respective fuel cells are basically operated by the same principle, but kinds of fuels used, operating temperatures, catalysts, electrolytes, etc. of the respective fuel cells are different. Thereamong, it is known that PEMFCs are operated at a low temperature, as compared to other fuel cells, have high power density, are small in size, and may thus be promising as not only small mounting-type power generation equipment but also transportation systems.

One of important factors to improve performance of the PEMFCs is to supply a designated amount or more of moisture to a polymer electrolyte membrane or a proton exchange membrane (PEM) of a membrane-electrolyte assembly (MEA) so as to maintain a desired water content. The reason for this is that, when the PEM is dried, power generation efficiency is rapidly decreased. In order to humidify the PEM, 1) a bubbler humidification method in which moisture is supplied by filling a pressure vessel with water and then causing target gas to pass through a diffuser, 2) a direct injection method in which an amount of supply moisture necessary for fuel cell reaction is calculated and then moisture is supplied directly to a gas flow pipe through a solenoid valve, and 3) a humidification membrane method in which moisture is supplied to a gas fluidized bed using a polymeric separation membrane. Thereamong, the humidification membrane method, in which vapor is fed to gas supplied to a polymer electrolyte membrane using a membrane selectively transmitting only vapor included in exhaust gas so as to humidify the polymer electrolyte membrane, is advantageous in that a humidifier may be lightweight and small.

As selectively transmitting membranes used in the humidification membrane method, hollow fiber membranes having a large transmission area per unit volume, if a module is formed, may be used. That is, if a humidifier is manufactured using hollow fiber membranes, high integration of the hollow fiber membranes having a large contact surface area is achieved and a fuel cell may be sufficiently humidified even at a small capacity of the humidifier, a low-cost material may be used, and moisture and heat included in unreacted gas of a high temperature discharged from the fuel cell may be collected and then reused through the humidifier.

However, a conventional hollow fiber membrane module has a short time for which a hot and humid humidifying fluid may directly contact hollow fiber membranes in the module and thereby have limits in raising heat/material transfer efficiency with a cool and dry fluid to be humidified and limits in enhancing humidifying efficiency of a product.

Further, in order to increase the capacity of hollow fiber membrane modules, technology in which a hollow fiber membrane bundle is partitioned or unit modules are integrated as cartridges is used. However, if such technology is used, a time taken to manufacture individual modules of the cartridges is long and thus manufacturing costs may be increased and, when the bundle is partitioned, workability in partitioning is lowered and thus quality variation may be increased.

PRIOR ART DOCUMENT

Korean Patent Laid-Open Publication No. 10-2011-0109814 (Publication Date: Oct. 6, 2011)
Korean Patent Laid-Open Publication No. 10-2013-0034404 (Publication Date: Apr. 5, 2013)

DISCLOSURE

Technical Problem

Therefore, the present invention has been made in view of the above problems, and it is an object of the present invention to provide a hollow fiber membrane module in which heat/material transfer efficiency may be raised due to increase in a contact time between a hot and humid humidifying fluid and a cool and dry fluid to be humidified and, thus, humidifying efficiency of a product may be maximized.

It is another object of the present invention to provide a hollow fiber membrane module in which hollow fiber membrane cartridges may be inserted into a housing and thus integrated with the housing so as to extend to products having various capacities, to increase utilization efficiency of the hollow fiber membrane cartridges and to reduce manufacturing time and costs through simple potting.

Technical Solution

The object of the present invention can be achieved by providing a hollow fiber membrane module including a housing provided with an inlet formed at one end thereof and an outlet formed at the other end thereof, a hot and humid humidifying fluid flowing into the housing through the inlet and the humidifying fluid after humidifying the interior of the housing flowing out of the housing through the outlet, at least one hollow fiber membrane bundle inserted into the housing in a length direction of the housing, a partitioning part configured to support the at least one hollow fiber membrane bundle and to partition the interior of the housing into an inflow space, in which the humidifying fluid flowing into the housing momentarily resides, and an outflow space, in which the humidifying fluid momentarily resides before being discharged to the outside of the housing through the outlet, and potting parts configured to pot both ends of the at least one hollow fiber membrane bundle to the housing.

A size of the inflow space may be equal to or greater than a size of the outflow space.

Hollow fiber membrane cartridges, potted together with the at least one hollow fiber membrane bundle to the housing at once, may be placed on both ends of the at least one follow fiber membrane bundle.

Vacant cartridges, inserted into the partitioning part without hollow fiber membrane bundles and potted to the housing at once, may be additionally provided within the housing according to a humidifying capacity or a humidification degree.

The vacant cartridges may have a circular, oval or polygonal cross-section and be closed so that no fluid flows into an insertion space of the partitioning part.

Fluid passage parts may be formed on the hollow fiber membrane cartridges so as to allow the fluid to easily flow into the at least one hollow fiber membrane bundle.

The at least one hollow fiber membrane bundle in the hollow fiber membrane cartridges may include 30 to 60% by volume of hollow fiber membranes with respect to a whole volume thereof.

The housing may have a circular, oval or polygonal cross-section.

The hollow fiber membrane cartridges may have a circular, oval or polygonal cross-section. A ratio of an equivalent diameter to a length of the at least one hollow fiber membrane bundle in the hollow fiber membrane cartridges may be 1:2~1:20.

Advantageous Effects

A hollow fiber membrane module in accordance with the present invention may increase a retention time of a hot and humid humidifying fluid in an inflow space into which the hot and humid humidifying fluid flows and thus enhance heat/material transfer efficiency to maximize humidifying efficiency of product, and prevent drop in temperature of the hot and humid humidifying fluid due to heat/material loss caused by the cool and dry fluid to be humidified, as the hot and humid humidifying fluid resides in the inflow space.

Further, since hollow fiber membrane cartridges are inserted into a housing and integrated with the housing, the housing may be manufactured according to the shape and number of the hollow fiber membrane cartridges and thus the hollow fiber membrane module may extend to products having various capacities, and utilization efficiency of the hollow fiber membrane cartridges may be increased according to the shape, number and size ratio of the hollow fiber membrane cartridges. Further, the hollow fiber membrane cartridges and hollow fiber membranes may be potted at once and thus manufacturing time and costs of the hollow fiber membrane module may be reduced through simple potting.

BEST MODE

Reference will now be made in detail to the preferred embodiments of the present invention, examples of which are illustrated in the accompanying drawings. However, those skilled in the art will appreciate that various modifications, additions and substitutions are possible, and the present invention is not limited to these embodiments.

Figure 1:
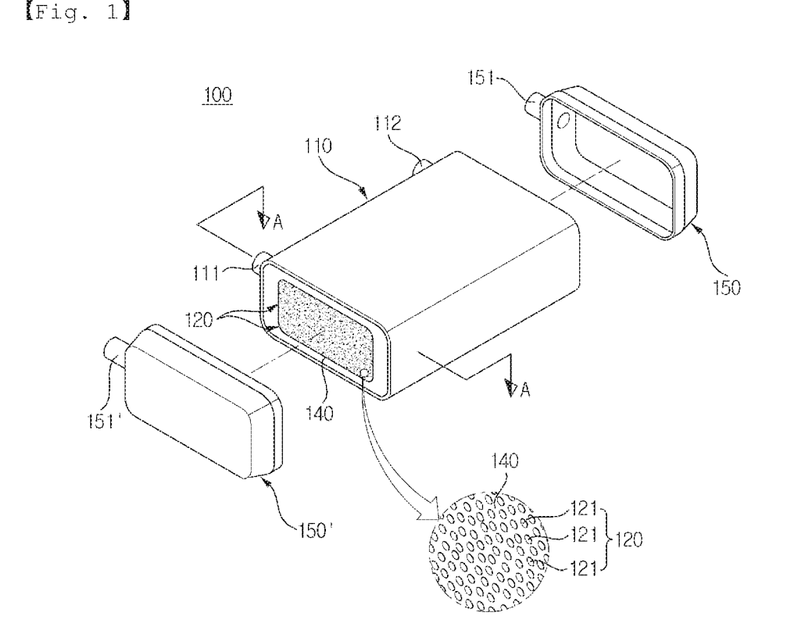
FIGS. 1 and 2 are partially exploded perspective views of hollow fiber membrane modules in accordance with a first embodiment of the present invention.
Figure 2:
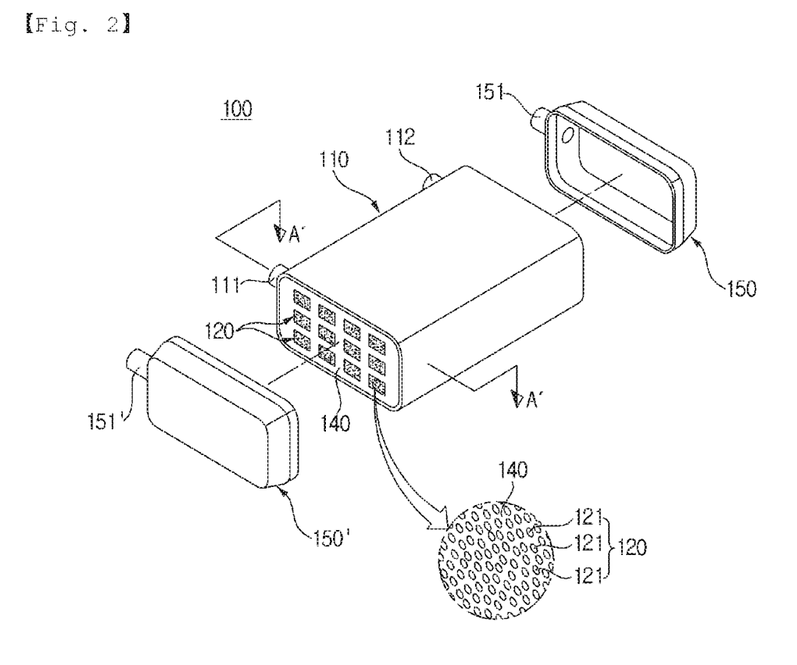

FIGS. 1 and 2 are partially exploded perspective views of hollow fiber membrane modules in accordance with a first embodiment of the present invention. FIG. 1 illustrates a hollow fiber membrane module including one hollow fiber membrane 120 placed therein, and FIG. 2 illustrates a hollow fiber membrane module including a plurality of hollow fiber membranes 120 placed therein.

As exemplarily shown in these figures, a hollow fiber membrane module 100 in accordance with one embodiment of the present invention includes a housing 110, at least one hollow fiber membrane bundle 120, a partitioning part 130, potting parts 140 and 140', and covers 150 and 150'.

The housing 110 and the covers 150 and 150' may form the external appearance of the hollow fiber membrane module 100 and be formed of hard plastic, such as polycarbonate, or metal. Further, the cross-sections of the housing body 110 and the covers 150 and 150' in the width direction may have an angular shape, as exemplarily shown in FIGS. 1 and 2, or have a circular shape, as exemplarily shown in FIG. 10. The angular shape may be a polygonal shape, such as a rectangle, a square, a trapezoid, a parallelogram, a pentagon or a hexagon, and be a polygonal shape having rounded corners. Further, the circular shape may be an oval.

An inlet 111, into which a hot and humid humidifying fluid flows, is formed at one end of the housing 110, and an outlet 112, from which the humidifying fluid after humidifying the inside of the housing 110 is discharged, is formed at the other end of the housing 110. The covers 150 and 150' are assembled with both ends of the housing 110.

The inlet 111 and the outlet 112 formed on the housing 110 may be arranged at one side of the housing 110 in parallel to each other, or be arranged on the housing 110 in a diagonal direction.

Figure 3:
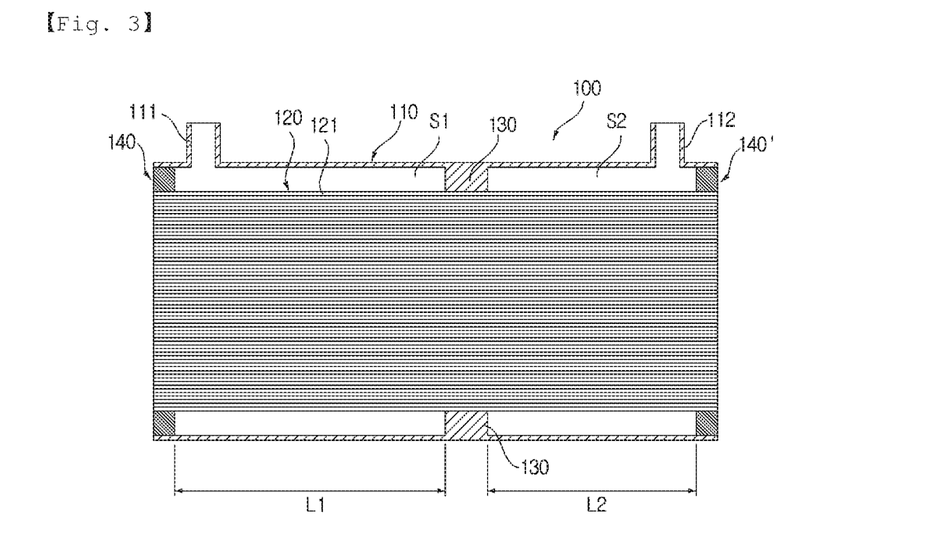
FIG. 3 is a cross-sectional (longitudinal cross-sectional) view taken along line A-A of FIG. 1.
Figure 4:
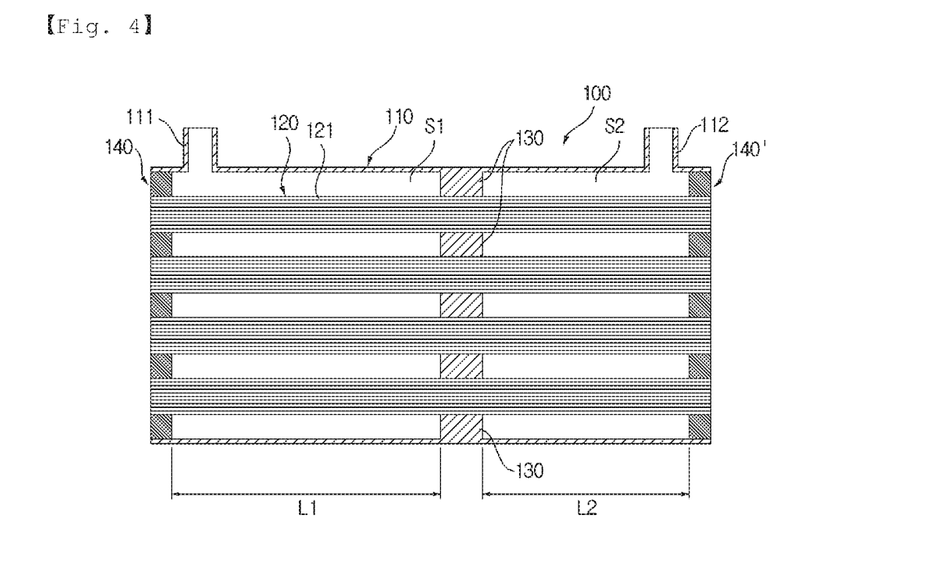
FIG. 4 is a cross-sectional (longitudinal cross-sectional) view taken along line A'-A' of FIG. 2.

FIG. 3 is a cross-sectional (longitudinal cross-sectional) view taken along line A-A of FIG. 1, and FIG. 4 is a cross-sectional (longitudinal cross-sectional) view taken along line A'-A' of FIG. 2.

One hollow fiber membrane bundle 120 or a plurality hollow fiber membrane bundles 120 is inserted into the housing 110 in the length direction according to capacities of the hollow fiber membrane module 100 and is supported by the partitioning part 130, thus being installed within the housing 110.

Hollow fiber membranes 121 of the hollow fiber membrane bundle 120 selectively transmit moisture. The hollow fiber membranes 121 may be formed of known materials and a detailed description thereof will thus be omitted. The hollow fiber membrane bundle 120 may include 30 to 60% by volume of the hollow fiber membranes 121 with respect to the whole volume of the hollow fiber membrane bundle 120. Further, the hollow fiber membrane bundle may be surrounded by a mesh net.

The partitioning part 130 may be provided within the housing 110 and support and partition at least one hollow fiber membrane bundle 120. The hollow fiber membrane bundles 120 are inserted into respective insertion spaces of the partitioning part 130, thus being supported by the partitioning part 130. Further, the partitioning part 130 partitions the inside of the housing 110 into an inflow space S1, in which the humidifying fluid flowing into the housing 110 through the inlet 111 momentarily resides, and an outflow space S2, in which the humidifying fluid momentarily resides before being discharged to the outside through the outlet 112. The size of the inflow space S1 is equal to or greater than the size of the outflow space S2.

Since the hollow fiber membrane module 100 secures the wider inflow space due to formation of the partitioning part, as compared to a conventional hollow fiber membrane module, the hot and humid humidifying fluid may reside in the inflow space S1 for a long time and then, the hot and humid humidifying fluid after purging may meet a cool and dry fluid to be humidified and exchange heat with the cool and dry fluid to be humidified, thereby enhancing heat transfer efficiency and maximizing humidifying efficiency of a product. Further, lowering of the temperature of the hot and humid humidifying fluid due to heat/material loss caused by the cool and dry fluid to be humidified may be prevented and, thus, the high temperature of the hot and humid humidifying fluid may be maintained.

Particularly, a ratio of a length L1 of the inflow space S1 in the length direction of the housing to a length L2 of the outflow space S2 in the length direction of the housing may be 6:4~9:1.

If a size of the inflow space S1 is greater than a size of the outflow space S2 such that the inflow space S1 and the outflow space S2 are asymmetrical, a time for which the hot and humid humidifying fluid humidifies the fluid to be humidified may be extended and thus humidifying efficiency may be enhanced.

The partitioning part 130 may be formed integrally with the housing 110, or be formed separately from the housing 110 and then assembled with the housing 110. The partitioning part 130 may have different wall thicknesses according to materials thereof and, as the wall thickness of the partitioning part 130 is decreased, efficiency of the partitioning part 130 is increased. The wall thickness of the partitioning part 130 may generally be 0.1 mm~70 mm and, particularly, the wall thickness of the partitioning part 130 formed of plastic may be 0.2 mm~40 mm and the wall thickness of the partitioning part 130 formed of metal may be 0.2 mm~50 mm.

If the wall thickness of the partitioning part 130 is less than the lower limit of the above range, the partitioning part 130 is excessively thin and thus has difficulty in withstanding pressure and, if the wall thickness of the partitioning part 130 exceeds the upper limit of the above range, the inflow space in which the hot and humid humidifying fluid resides is not sufficiently secured and desired enhancement of humidifying effects is difficult.

The potting parts 140 and 140' fill pores between the hollow fiber membranes 121 while binding the hollow fiber membranes 121 of the at least one hollow fiber membrane bundle 120 at ends (sides of fluid passage parts) of the at least one hollow fiber membrane bundle 120, and contact the inner surfaces of both ends of the housing 110 and thus hermetically seal the housing 110. The potting parts 140 and 140' may be formed of known materials and a detailed description thereof will thus be omitted.

The potting parts 140 and 140' are formed within both ends of the housing 110 and, thus, both ends of the at least one hollow fiber membrane bundle 120 are fixed to the housing 110. Therefore, both ends of the housing 110 are closed by the potting parts 140 and 140' and thus flow paths along which the humidifying fluid passes are formed in the housing 110. In the present invention, a plurality of hollow fiber membrane bundles 120 is potted to the housing 110 at once.

The housing covers 150 and 150' are combined with both ends of the housing 110. Fluid ports 151 and 151', through which the fluid to be humidified flows into and out of the housing 110, are formed at designated sides of the covers 150 and 150'. A pair of fluid ports 151 and 151' may be disposed in the same direction and, as exemplarily shown in FIGS. 1 and 2, the fluid ports 151 and 151' may be disposed in the same direction as the inlet 111 and the outlet 112 formed on the housing 110. If the elements through which the fluids flow into and out of the housing 110 are disposed in the same direction, when the hollow fiber membrane module 100 is installed in a fuel cell system, the fuel cell system may be easily miniaturized due to spatial merits. The fluid to be humidified flowing into the fluid port 151 of one cover 150 is humidified while passing through inner ducts of the hollow fiber membranes 121 of the at least one hollow fiber membrane bundle 120 and is discharged to the outside through the fluid port 151' of the other cover 150'.

Figure 5:
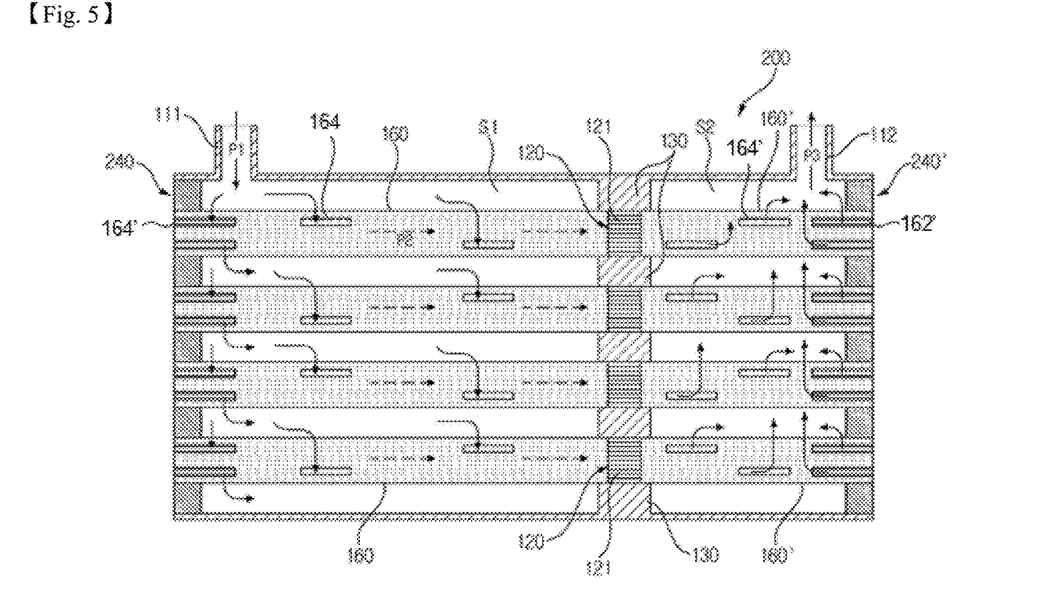
FIGS. 5 and 6 are cross-sectional (longitudinal cross-sectional) views illustrating a hollow fiber membrane module in accordance with a second embodiment of the present invention.
Figure 6:
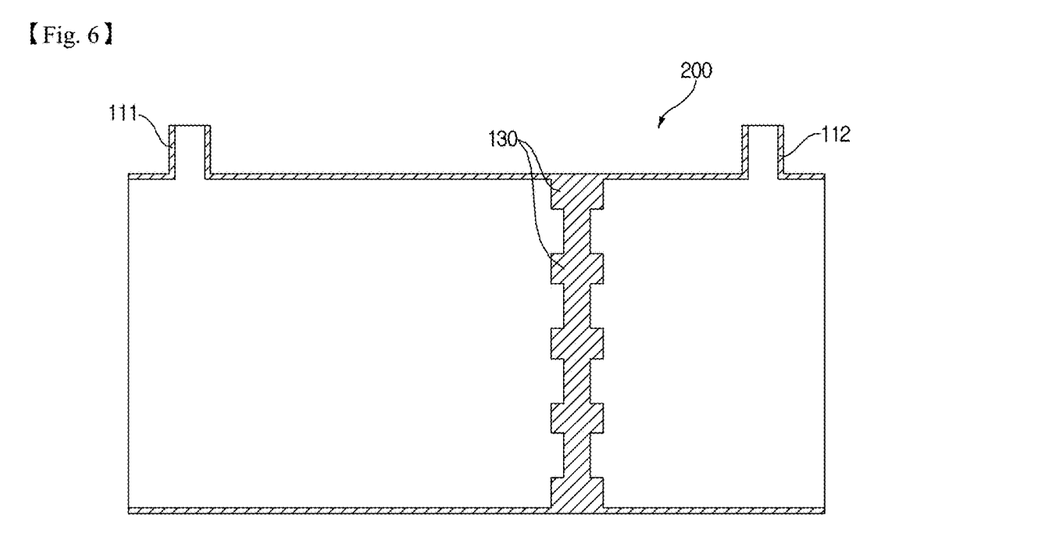

FIGS. 5 and 6 are cross-sectional (longitudinal cross-sectional) views illustrating a hollow fiber membrane module in accordance with a second embodiment of the present invention and, in more detail, FIG. 5 illustrates a hollow fiber membrane module 200 in which hollow fiber membrane cartridges 160 and 160' are inserted into a housing 110, and FIG. 6 illustrates the housing 110 of the hollow fiber membrane module 200 before the hollow fiber membrane cartridges 160 and 160' are inserted into the housing 110.

As exemplarily shown in these figures, the hollow fiber membrane module 200 in accordance with the second embodiment includes the housing 110, hollow fiber membrane bundles 120, a partitioning part 130, potting parts 240 and 240', covers 150 and 150' and the hollow fiber membrane cartridges 160 and 160'. In the second embodiment, the hollow fiber membrane cartridges 160 and 160', which are potted together with the hollow fiber membrane bundles 120 to the housing 110 at once, are placed on both sides of the hollow fiber membrane bundles 120.

The potting parts 240 and 240' fill pores between hollow fiber membranes 121 while binding the hollow fiber membranes 121 of the hollow fiber membrane bundles 120 at ends (sides of fluid passage parts) of the hollow fiber membrane bundles 120, and contact the inner surfaces of both ends of the housing 110 and thus hermetically seal the housing 110. The potting parts 240 and 240' may be formed of known materials and a detailed description thereof will thus be omitted.

The potting parts 240 and 240' are formed within both ends of the housing 110 and, thus, both ends of the hollow fiber membrane bundles 120 within the hollow fiber membrane cartridges 160 and 160' are fixed to the housing 110. Therefore, both ends of the housing 110 are closed by the potting parts 240 and 240' and thus flow paths along which the humidifying fluid passes are formed in the housing 110. In the present invention, a plurality of hollow fiber membrane cartridges 160 and 160' and a plurality of hollow fiber membrane bundles 120 are potted to the housing 110 at once.

The hollow fiber membrane cartridges 160 and 160' are placed on the outer surfaces of both sides of the hollow fiber membrane bundles 120 inserted into the housing 110 in the length direction of the housing, and one side of each of the hollow fiber membrane cartridges 160 and 160' is supported by the partitioning part 130. The hollow fiber membrane cartridge 160 or 160' is configured such that a plurality of fluid passage parts 162 or 162' is formed on the outer surface of one end of a body 161 or 161' having both sides which are open, and the fluid easily flows into spaces between the hollow fiber membranes 121 of the hollow fiber membrane bundle 120 through the fluid passage parts 162 or 162'. Further, a part of each of the hollow fiber membrane cartridges 160 and 160' is located at the side of the potting part 240 or 240' and thus potting of the hollow fiber membrane cartridges 160 and 160' is easily carried out.

Windows 164, through which the fluid may flow into the cartridges, may be formed on the side walls of the bodies 161 and 161' of the hollow fiber membrane cartridges 160 and 160' formed in the length direction of the housing.

The windows 164 allow the hot and humid humidifying fluid within the inflow space S1 or the outflow space S2 to be more effectively transferred to the hollow fiber membranes and may thus more effectively prevent lowering of the temperature of the hollow fiber membranes and drying of the hollow fiber membranes so as to enhance humidification performance.

Further, the size of the windows 164 may be equal to or smaller than the size of the fluid passage parts 162 and 162'. If the size of the windows 164 is greater than the size of the fluid passage parts 162 and 162', the fluid flowing from the inlet flows into the windows 164 earlier than the flow passage parts 162 and 162' and may thus interrupt an overall fluid flow.

Further, when the hot and humid humidifying fluid flowing into the inlet 111 directly contacts the hollow fiber membranes, the hollow fiber membranes may be damaged and, thus, the windows 164 may be located at positions which do not directly face the inlet 111.

FIG. 7A to 7D is a perspective view illustrating modifications of the hollow fiber membrane cartridge of the hollow fiber membrane module in accordance with the second embodiment of the present invention.

Figure 7A:
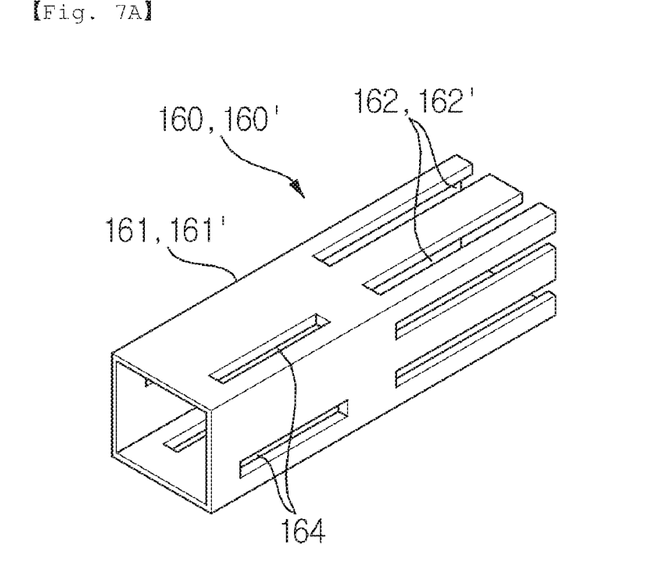
FIG. 7A to 7D is a perspective view illustrating modifications of a hollow fiber membrane cartridge of the hollow fiber membrane module in accordance with the second embodiment of the present invention.
Figure 7B:
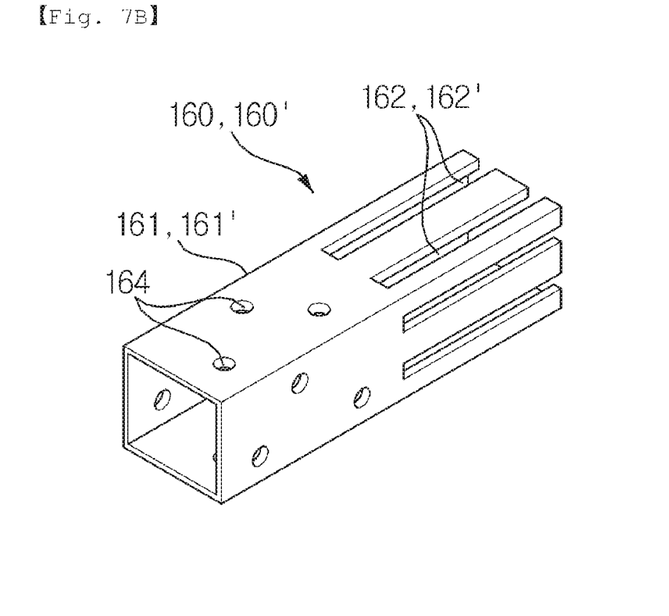

Further, windows 164 may extend in the length direction of the hollow fiber membrane cartridge 160, as exemplarily shown in FIG. 7A, a plurality of windows 164 having a circular shape may be alternately arranged, as exemplarily shown in FIG. 7B, or windows 164 may be formed as holes extending in a direction intersecting the length direction of the hollow fiber membrane cartridge 160 such that the sizes of the windows 164 may be gradually decreased (in FIG. 7C) or gradually increased (in FIG. 7D) as the windows 164 become far away from the end of the hollow fiber membrane cartridge 160.

Figure 7C:
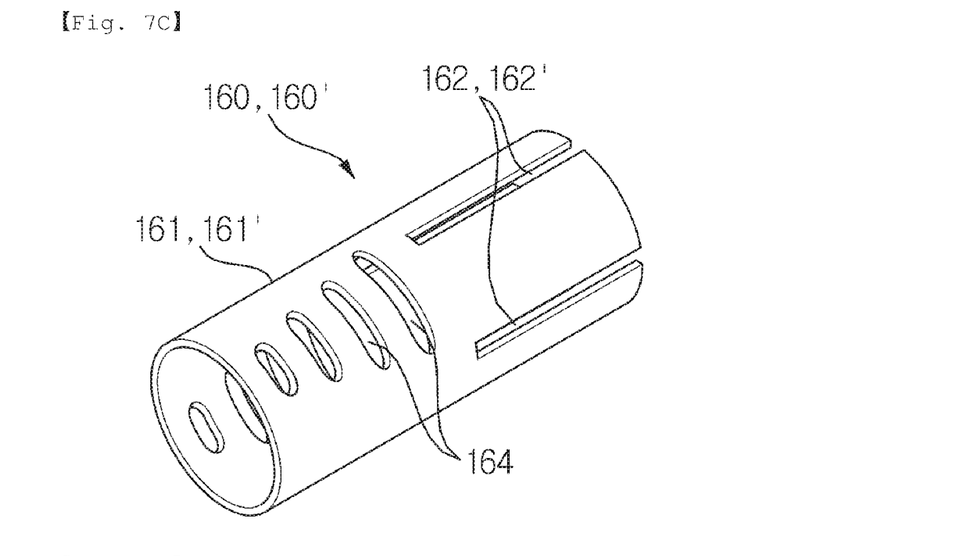
Figure 7D:
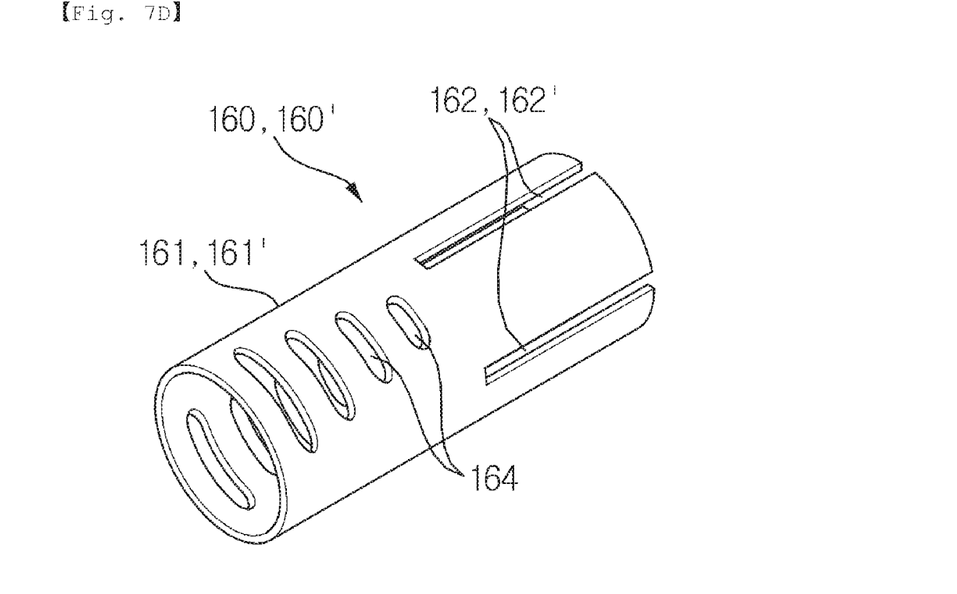

The cross-sections of the hollow fiber membrane cartridges 160 and 160' may have a rectangular shape, as exemplarily shown in FIGS. 7A and 7B, have a circular shape, as exemplarily shown in FIGS. 7C and 7D, or have an oval shape or various polygonal shapes and the polygonal shapes may have rounded corners.

A ratio of an equivalent diameter to a length of the hollow fiber membrane bundle in the hollow fiber membrane cartridge may be 1:2~1:20. Here, the equivalent diameter is a diameter to convert a surface area of a polygonal duct, which a fluid contacts, into a surface area of a circular duct having the same size, i.e., a diameter of a circular duct serving as a base when friction of flow, a velocity of flow, heat transfer, etc. are calculated. The equivalent diameter may be calculated through known methods according to polygonal or various shapes of ducts.

The hollow fiber membrane cartridges 160 and 160' may be formed of any one of a liquid crystal polymer, a plastic including glass fibers and a metal. If the plastic includes glass fibers, the plastic may include 5~50% of glass fibers. When the plastic includes less than 5% of glass fibers, effects of the glass fibers are insignificant and, when the plastic includes more than 50% of glass fibers, strength of the hollow fiber membrane cartridges may be lowered. The metal may have thermal conductivity of 10 kcal/mh° C. or more.

The hollow fiber membrane cartridges 160 and 160' may have different wall thicknesses according to materials thereof, efficiency of the hollow fiber membrane cartridges 160 and 160' is increased as the wall thickness of the hollow fiber membrane cartridges 160 and 160' is decreased, and the wall thickness of the hollow fiber membrane cartridges 160 and 160' may be 10 mm or less. If the wall thickness of the hollow fiber membrane cartridges 160 and 160' exceeds 10 mm, heat transfer efficiency may be remarkably lowered. In general, the wall thickness of the hollow fiber membrane cartridges 160 and 160' formed of a plastic may be 0.2 mm~3 mm, and the wall thickness of the hollow fiber membrane cartridges 160 and 160' formed of a metal may be 0.1 mm~5 mm.

The remaining elements, i.e., the housing 110, the hollow fiber membrane bundles 120, the partitioning part 130 and the covers 150 and 150', of the hollow fiber membrane module 200 in accordance with the second embodiment are the same as those of the hollow fiber membrane module in accordance with the first embodiment and a detailed description thereof will thus be omitted.

The humidifying fluid flows into the housing 110 along a path P1 through the inlet 111, resides in the inner space S1, flows into the hollow fiber membrane cartridges 160 at one end of the housing 110 through the fluid passage parts 162 or the windows 164, and moves to the hollow fiber membrane cartridges 160' at the other end of the housing 110 along a path P2. As the humidifying fluid moves along the hollow fiber membrane cartridges 160 and 160', the humidifying fluid exchanges heat with the cool and dry fluid to be humidified flowing along the insides of the hollow fiber membranes 121 and then flows to the outflow space S2 through the fluid passage parts 162' or the windows 164' of the hollow fiber membrane cartridges 160' at the other end of the housing 110. The humidifying fluid, which is dried through heat exchange, is discharged to the outside of the housing 110 along a path P3 through the outlet 112.

Figure 8:
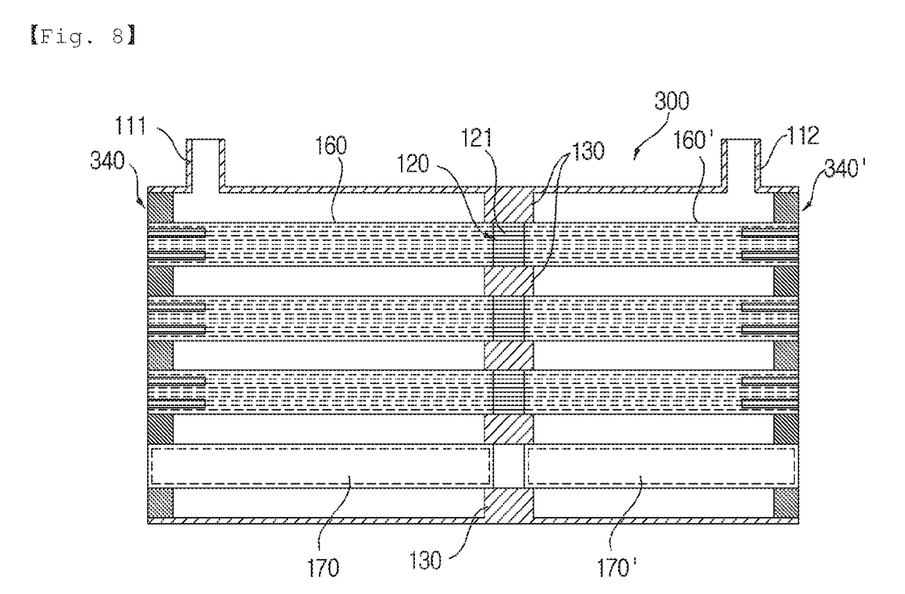
FIG. 8 is a cross-sectional (longitudinal cross-sectional) view illustrating a hollow fiber membrane module in accordance with a third embodiment of the present invention.
Figure 9:
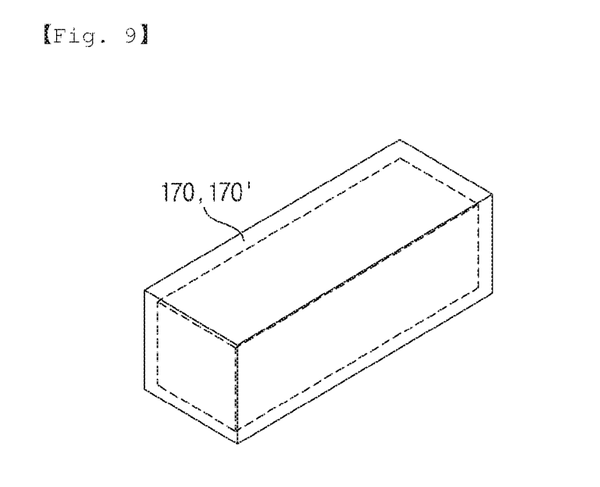
FIG. 9 is a perspective view illustrating a vacant cartridge of FIG. 8.

FIG. 8 is a cross-sectional (longitudinal cross-sectional) view illustrating a hollow fiber membrane module in accordance with a third embodiment of the present invention, and FIG. 9 is a perspective view illustrating a vacant cartridge of FIG. 8. As exemplarily shown in these figures, a hollow fiber membrane module 300 in accordance with the third embodiment includes a housing 110, hollow fiber membrane bundles 120, a partitioning part 130, potting parts 340 and 340', covers 150 and 150', hollow fiber membrane cartridges 160 and 160', and vacant cartridges 170 and 170'. In the second embodiment, the vacant cartridges 170 and 170', which are inserted into the partitioning part 130 without hollow fiber membrane bundles and potted to the housing at once, are additionally provided within the housing 110 according to a humidifying capacity or a humidification degree.

The cross-sections of the vacant cartridges 170 and 170' have a circular, oval or polygonal shape and the vacant cartridges 170 and 170' are closed so that no fluid flows into an insertion space of the partitioning part 130. The vacant cartridges 170 and 170' in accordance with the third embodiment may have a square column shape fitted into the insertion space of the partitioning part 130. The insertion space of the partitioning part 130, into which the vacant cartridge 170 is inserted, is vacant. The remaining elements of the hollow fiber membrane module in accordance with the third embodiment are the same as those of the hollow fiber membrane module in accordance with the second embodiment and a detailed description thereof will thus be omitted.

Figure 10:
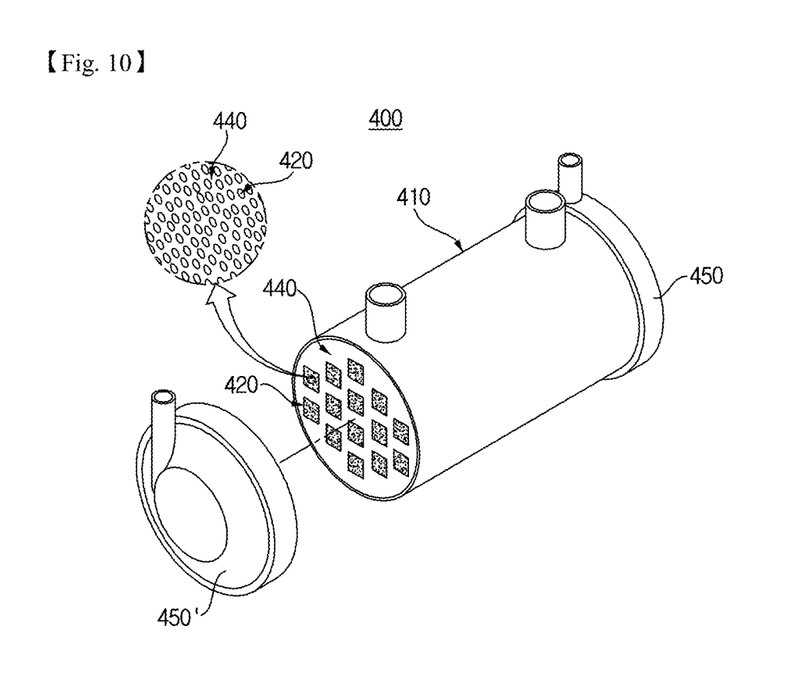
FIG. 10 is a partially exploded perspective view of a hollow fiber membrane module in accordance with a fourth embodiment of the present invention.
Figure 11:
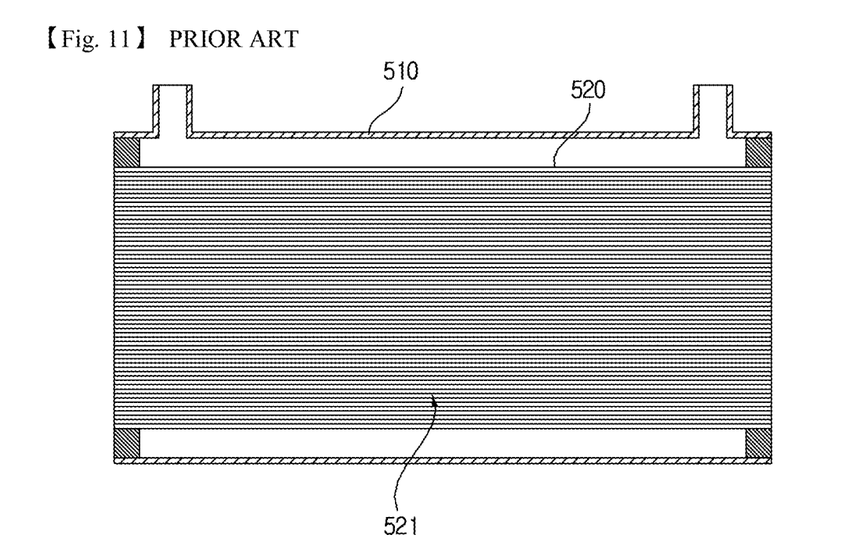
FIG. 11 is a longitudinal cross-sectional view of a conventional hollow fiber membrane module.
Figure 12:
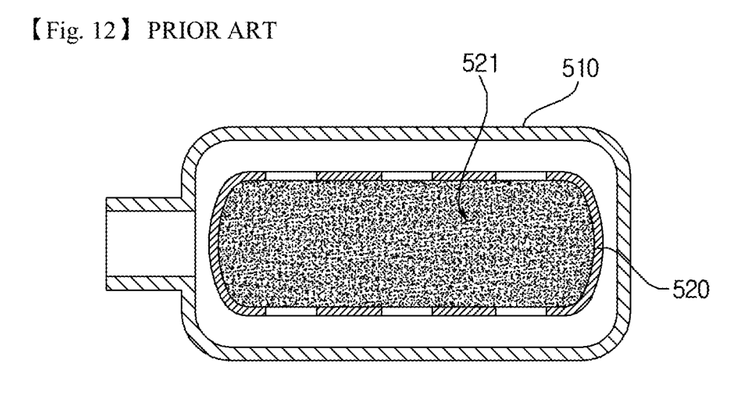
FIG. 12 is a transversal cross-sectional view of the conventional hollow fiber membrane module.

FIG. 10 is a partially exploded perspective view of a hollow fiber membrane module in accordance with a fourth embodiment of the present invention. As exemplarily shown in this figure, a hollow fiber membrane module 400 in accordance with the fourth embodiment includes a housing 410, hollow fiber membrane bundles 420, a partitioning part (not shown), potting parts 440, covers 450 and 450' and hollow fiber membrane cartridges (not shown). The hollow fiber membrane module 400 in accordance with the fourth embodiment has a cylindrical shape, and the remaining elements of the hollow fiber membrane module 400 are similar to those of the hollow fiber membrane modules in accordance with the first to third embodiments and a detailed description thereof will thus be omitted.

In the above-described hollow fiber membrane module, since the hollow fiber membrane cartridges are inserted into the housing and integrated with the housing, the housing may be manufactured according to the shape and number of the hollow fiber membrane cartridges and thus the hollow fiber membrane module may extend to products having various capacities, and utilization efficiency of the hollow fiber membrane cartridges may be increased according to the shape, number and size ratio of the hollow fiber membrane cartridges. Further, a plurality of hollow fiber membrane cartridges may be potted at once and thus manufacturing time and costs of the hollow fiber membrane module may be reduced through simple potting.

Hereinafter, the configuration and effects of the present invention will be described in more detail through test examples in which hollow fiber membrane modules in accordance with the second embodiment of the present invention are manufactured, comparative examples and a test. The test examples are only to exemplarily describe the invention and do not limit the spirit or scope of the invention.

TEST EXAMPLES

Manufacture of Hollow Fiber Membrane Modules

Test Example 1

4,200 polysulfone hollow fiber membranes (having an outer diameter of 900 µm and an inner diameter of 800 µm) were disposed in an angular housing (having a width of 250 mm, a height 150 mm and a length of 300 mm), both ends of the housing were covered with caps for formation of potting parts, and a potting composition was injected into spaces in a hollow fiber membrane bundle and a space between the hollow fiber membrane bundle and the housing and was then hardened so as to be sealed. After the caps for formation of potting parts were removed, ends of the hardened potting composition were cut so as to form potting parts in which ends of the hollow fiber membrane bundle are exposed to the cut ends of the hardened potting composition, and both ends of the housing were covered with covers, thus manufacturing a hollow fiber membrane module. Here, the hollow fiber membrane module is a symmetrical hollow fiber membrane module in which a ratio of a length (150 mm) of an inflow space to a length (150 mm) of an outflow space is 5:5.

Test Example 2

4,200 polysulfone hollow fiber membranes (having an outer diameter of 900 µm and an inner diameter of 800 µm) were divided into 12 bundles (each bundle having 350 hollow fiber membranes) respectively integrated as cartridges, the 12 cartridges were disposed in an angular housing (having a width of 250 mm, a height 150 mm and a length of 300 mm) and potted to the housing to form potting parts at both ends of the housing, and both ends of the housing were covered with covers, thus manufacturing a humidification module. Here, the humidification module is a symmetrical humidification module in which a ratio of a length (150 mm) of an inflow space to a length (150 mm) of an outflow space is 5:5.

Test Example 3

4,200 polysulfone hollow fiber membranes (having an outer diameter of 900 µm and an inner diameter of 800 µm) were divided into 12 bundles (each bundle having 350 hollow fiber membranes), and hollow fiber membrane cartridges were placed on both ends of the respective bundles and then inserted into insertion spaces of a partitioning part formed in an angular housing (having a width of 250 mm, a height 150 mm and a length of 300 mm).

Both ends of the housing were covered with caps for formation of potting parts, and a potting composition was injected into spaces between the hollow fiber membrane bundles and a space between the cartridges and the housing and was then hardened so as to be sealed. After the caps for formation of potting parts were removed, ends of the hardened potting composition were cut so as to form potting parts in which ends of the hollow fiber membrane bundles are exposed to the cut ends of the hardened potting composition, and both ends of the housing were covered with covers, thus manufacturing a hollow fiber membrane module. Here, the hollow fiber membrane module is an asymmetrical hollow fiber membrane module in which a ratio of a length (180 mm) of an inflow space to a length (120 mm) of an outflow space is 6:4.

Test Example 4

4,200 polysulfone hollow fiber membranes (having an outer diameter of 900 μm and an inner diameter of 800 μm) were divided into 12 bundles having a rectangular cross-section (each bundle having 350 hollow fiber membranes), and hollow fiber membrane cartridges were placed on both ends of the respective bundles and then inserted into insertion spaces of a partitioning part formed in an angular housing (having a width of 250 mm, a height 150 mm and a length of 300 mm).

Both ends of the housing were covered with caps for formation of potting parts, and a potting composition was injected into spaces between the hollow fiber membrane bundles and a space between the cartridges and the housing and was then hardened so as to be sealed. After the caps for formation of potting parts were removed, ends of the hardened potting composition were cut so as to form potting parts in which ends of the hollow fiber membrane bundles are exposed to the cut ends of the hardened potting composition, and both ends of the housing were covered with covers, thus manufacturing a hollow fiber membrane module. Here, the hollow fiber membrane module is an asymmetrical hollow fiber membrane module in which a ratio of a length (240 mm) of an inflow space to a length (60 mm) of an outflow space is 8:2.

Comparative Example 1

As exemplarily shown in FIGS. 11 and 12, 4,200 polysulfone hollow fiber membranes (having an outer diameter of 900 μm and an inner diameter of 800 μm) were integrated as one cartridge, the cartridge was disposed in an angular housing (having a width of 250 mm, a height 150 mm and a length of 300 mm), potting parts were formed at both ends of the housing by performing potting of the cartridge one time, and both ends of the housing were covered with covers, thus manufacturing a humidification module.

[Test: Measurement of Performance of Manufactured Hollow fiber Membrane Modules]

Dry air was supplied to the insides and outsides of the hollow fiber membranes of the hollow fiber membrane modules manufactured by Test Examples and Comparative Example at a rate of 50 g/sec, the outsides of the hollow fiber membranes were fixed under conditions of a temperature of 70° C. and a humidity of 90%, the insides of the hollow fiber membranes were fixed under conditions of a temperature of 40° C. and a humidity of 10%, and thus gas-gas humidification was carried out.

Humidification performance was acquired by measuring temperature and humidity at a point, from which air flowing inside the hollow fiber membranes is humidified and then discharged, and converting the same into a dew point, and Table 1 below shows acquired results together with number of times of potting.

TABLE 1

| Division | Test example 1 | Test example 2 | Test example 3 | Test example 4 | Comparative example 1 |
|---|---|---|---|---|---|
| Position of partitioning part | 5:5 | 5:5 | 6:4 | 8:2 | — |
| Humidification performance (° C.) | 57.5 | 58.3 | 59.3 | 60.3 | 56.5 |

With reference to Table 1, it may be understood that the hollow fiber membrane modules manufactured by Test Examples 1 to 4 have better humidification performance than the hollow fiber membrane module manufactured by Comparative Example 1.

It will be apparent to those skilled in the art that various modifications and variations can be made in the present invention without departing from the spirit or scope of the invention. Thus, it is intended that the present invention cover the modifications and variations of this invention provided they fall within the scope of the appended claims and their equivalents.

DESCRIPTION OF NUMERALS AND MARKS 100, 200: hollow fiber membrane module
110: housing 111: inlet
112: outlet 120: hollow fiber membrane bundle
121: hollow fiber membrane 130: partitioning part
140, 140': potting part 150, 150': cover
151, 151': fluid port 160, 160': hollow fiber membrane cartridge
161, 161': body 162, 162': fluid passage part
170: vacant cartridge
S1: inflow space S2: outflow space

The invention claimed is:

1. A hollow fiber membrane module comprising:
a housing provided with an inlet formed at one end thereof and an outlet formed at the other end thereof, configured to receive a first fluid flowing into the housing through the inlet, humidifying a second fluid in the housing, and flowing out of the housing through the outlet;
at least one hollow fiber membrane bundle inserted into the housing in a length direction of the housing;
a partitioning part configured to support the at least one hollow fiber membrane bundle and to partition the interior of the housing into an inflow space, in which the first fluid flowing into the housing momentarily resides, and an outflow space, in which the first fluid momentarily resides before flowing out of the housing through the outlet;
potting parts in which both ends of the hollow fiber membrane bundle are potted so that the hollow fiber membrane bundle is fixed to the housing; and
hollow fiber membrane cartridges each containing the hollow fiber membrane bundle therein, respectively,
wherein each of the hollow fiber membrane cartridges comprises a body both end of which are open,
wherein the body has a fluid passage parts at one end thereof and is inserted into and thus supported by the partitioning part at the other end thereof, and
wherein the fluid passage parts are at least partially filled with the potting parts so that the hollow fiber membrane cartridges and the hollow fiber membrane bundle are fixed to the housing together by the potting parts.

2. The hollow fiber membrane module according to claim 1, wherein a size of the inflow space is equal to or greater than a size of the outflow space.

3. The hollow fiber membrane module according to claim 1, further comprising vacant cartridges which are closed and have no hollow fiber membrane bundle therein, wherein the vacant cartridges are potted in the potting parts at one end thereof and are inserted into and thus supported by the partitioning part at the other end thereof.

4. The hollow fiber membrane module according to claim 3, wherein the vacant cartridges have a circular, oval or polygonal cross-section.

5. The hollow fiber membrane module according to claim 1, wherein the hollow fiber membrane bundle in the hollow fiber membrane cartridges comprises 30 to 60% by volume of hollow fiber membranes with respect to a whole volume thereof.

6. The hollow fiber membrane module according to claim 1, wherein the hollow fiber membrane cartridges have a circular, oval or polygonal cross-section.

7. The hollow fiber membrane module according to claim 1, wherein a ratio of an equivalent diameter to a length of the hollow fiber membrane bundle in the hollow fiber membrane cartridges is 1:2-1:20.

8. The hollow fiber membrane module according to claim 1, wherein a wall thickness of the hollow fiber membrane cartridges is 10 mm or less.

9. The hollow fiber membrane module according to claim 1, wherein the body further has windows between the fluid passage parts and the other end thereof inserted into and thus supported by the partitioning part so as to allow the first fluid to flow into the hollow fiber membrane cartridges.

10. The hollow fiber membrane module according to claim 9,
wherein a size of the windows is equal to or smaller than a size of the fluid passage parts.

* * * * *